US012792451B2

(12) United States Patent
Sudidhala et al.

(10) Patent No.: US 12,792,451 B2
(45) Date of Patent: Nov. 10, 2026

(54) SYSTEM AND METHOD FOR IDENTIFYING FAULT RESOLUTION STEPS FOR EQUIPMENT BASED ON MULTI-MODAL DIAGNOSIS DATA

(71) Applicant: Wipro Limited, Bangalore (IN)

(72) Inventors: Raja Sekhar Reddy Sudidhala, Bangalore (IN); Gopichand Agnihotram, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 484 days.

(21) Appl. No.: 18/484,965

(22) Filed: Oct. 11, 2023

(65) Prior Publication Data

US 2025/0077338 A1 Mar. 6, 2025

(30) Foreign Application Priority Data

Aug. 29, 2023 (IN) ............................ 202341057821

(51) Int. Cl.
*G06F 11/30* (2006.01)
*G06F 11/07* (2006.01)
(Continued)

(52) U.S. Cl.
CPC ........ *G06F 11/0793* (2013.01); *G06F 11/079* (2013.01); *G06F 11/22* (2013.01); *G06T 19/006* (2013.01)

(58) Field of Classification Search
None
See application file for complete search history.

(56) References Cited

U.S. PATENT DOCUMENTS

2013/0067277 A1* 3/2013 Mummidi ........... G06F 11/2097 707/645
2019/0219994 A1 7/2019 Yan et al.
(Continued)

FOREIGN PATENT DOCUMENTS

EP 3336640 A1 6/2018

OTHER PUBLICATIONS

Hongli et al., "Application of AR Technology in Aircraft Maintenance Manual", J. Phys.: Conf. Ser. 1738 012133, https://iopscience.iop.org/article/10.1088/1742-6596/1738/1/012133/pdf, 2021, 6 pages.
(Continued)

*Primary Examiner* — Phuong Huynh
(74) *Attorney, Agent, or Firm* — Finnegan, Henderson, Farabow, Garrett & Dunner, LLP

(57) ABSTRACT

The present disclosure discloses a method and a system for identifying fault resolution steps for an equipment. Method captures multi-modal diagnosis data associated with at least one primary part in the equipment. Method obtains multi-modal features of the at least one primary part from the multi-modal diagnosis data. Method detects a condition state of the at least one primary part using the multi-modal features and a trained object fault detection model. Method determines location of a fault on the at least one primary part using a trained fault location prediction model when the condition state is detected as a faulty state. Method identifies primary fault resolution steps for the at least one primary part based on historic data associated with the at least one primary part and the location of the fault. Method identifies secondary resolution steps for secondary parts based on the primary fault resolution steps before rendering.

12 Claims, 5 Drawing Sheets

(51) Int. Cl.
*G06F 11/22* (2006.01)
*G06T 19/00* (2011.01)

(56) References Cited

U.S. PATENT DOCUMENTS

| | | | |
|---|---|---|---|
| 2020/0133254 | A1 | 4/2020 | Cella et al. |
| 2021/0080139 | A1 | 3/2021 | Brown et al. |
| 2021/0090461 | A1 | 3/2021 | Cannarsa et al. |

OTHER PUBLICATIONS

Extended European Search Report, dated May 13, 2024, in European Application No. EP 23213845.3.

* cited by examiner

SYSTEM AND METHOD FOR IDENTIFYING FAULT RESOLUTION STEPS FOR EQUIPMENT BASED ON MULTI-MODAL DIAGNOSIS DATA

TECHNICAL FIELD

The present subject matter generally relates to fault detection and resolution, more particularly, to a method and a system for identifying fault resolution steps for an equipment based on multi-modal diagnosis data.

BACKGROUND

Artificial Intelligence (AI) is rapidly becoming a popular and useful mechanism for developing assistance systems for users in most of the industries. AI devices are programmed with a set of actions including guided procedures/list of action items to the user in order to perform quick tasks such as machine maintenance and repair. With the help of guidance provided by the AI system, the user can finish an intended task without sufficient prior knowledge. Therefore, many industries are looking towards AI systems to develop various sub-systems that can be used for automatically analyzing issues/problems and providing solutions to perform actions or tasks by the user especially in case of machine repair and maintenance.

Conventionally, in order to identify the fault (anomaly) in a device, automated machine fault detection mechanisms are used that are less accurate due to use of limited inputs and dependency on sensor information for fault detection. Such in-accurate detection may result in incorrect resolution of the fault. Most often cascading effect of such resolution is not considered or provided in the existing resolution mechanisms.

The information disclosed in this background of the disclosure section is for enhancement of understanding of the general background of the invention and should not be taken as an acknowledgement or any form of suggestion that this information forms the prior art already known to a person skilled in the art.

SUMMARY

Embodiments of the present disclosure addresses the problems associated with identifying fault resolution steps for an equipment.

In an embodiment, there is a method provided for identifying fault resolution steps for an equipment. The method captures multi-modal diagnosis data associated with at least one primary part in the equipment. Thereafter, the method obtains multi-modal features of the at least one primary part from the multi-modal diagnosis data. The method detects a condition state of the at least one primary part using the multi-modal features and a trained object fault detection model. Subsequently, the method determines location of a fault on the at least one primary part using a trained fault location prediction model when the condition state of the at least one primary part is detected as a faulty state. Lastly, the method identifies primary fault resolution steps for the at least one primary part based on historic data associated with the at least one primary part and the location of the fault.

In an embodiment, there is a system for identifying fault resolution steps for an equipment. The system includes a processor and a memory communicatively coupled to the processor, wherein the memory stores processor-executable instructions, which on execution by the processor, cause the processor to capture multi-modal diagnosis data associated with at least one primary part in the equipment. Thereafter, the processor is configured to obtain multi-modal features of the at least one primary part from the multi-modal diagnosis data. The processor is configured to detect a condition state of the at least one primary part using the multi-modal features and a trained object fault detection model. Subsequently, the processor is configured to determine location of a fault on the at least one primary part using a trained fault location prediction model when the condition state of the at least one primary part is detected as a faulty state. Lastly, the processor is configured to identify primary fault resolution steps for the at least one primary part based on historic data associated with the at least one primary part and the location of the fault.

In an embodiment, there is a non-transitory computer readable medium including instructions stored thereon that when processed by at least one processor cause a system to perform operations comprising capturing multi-modal diagnosis data associated with at least one primary part in the equipment. Thereafter, the instructions cause the at least one processor to obtain multi-modal features of the at least one primary part from the multi-modal diagnosis data and to detect a condition state of the at least one primary part using the multi-modal features and a trained object fault detection model. Subsequently, the instructions cause the at least one processor to determine location of a fault on the at least one primary part using a trained fault location prediction model when the condition state of the at least one primary part is detected as a faulty state. Lastly, the instructions cause the at least one processor to identify primary fault resolution steps for the at least one primary part based on historic data associated with the at least one primary part and the location of the fault.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. The same numbers are used throughout the figures to reference like features and components. Some embodiments of system and/or methods in accordance with embodiments of the present subject matter are now described below, by way of example only, and with reference to the accompanying figures.

FIG. 1 illustrates an environment for identifying fault resolution steps for an equipment in accordance with some embodiments of the present disclosure.

FIG. 2*a* shows a detailed block diagram of a system in accordance with some embodiments of the present disclosure.

FIG. 2*b* illustrates an example of predicted multi-modal features and actual multi-modal features in accordance with some embodiments of the present disclosure.

FIG. 2*c* illustrates an example of a region of fault location indicating unmatched features in accordance with some embodiments of the present disclosure.

Figure 1:
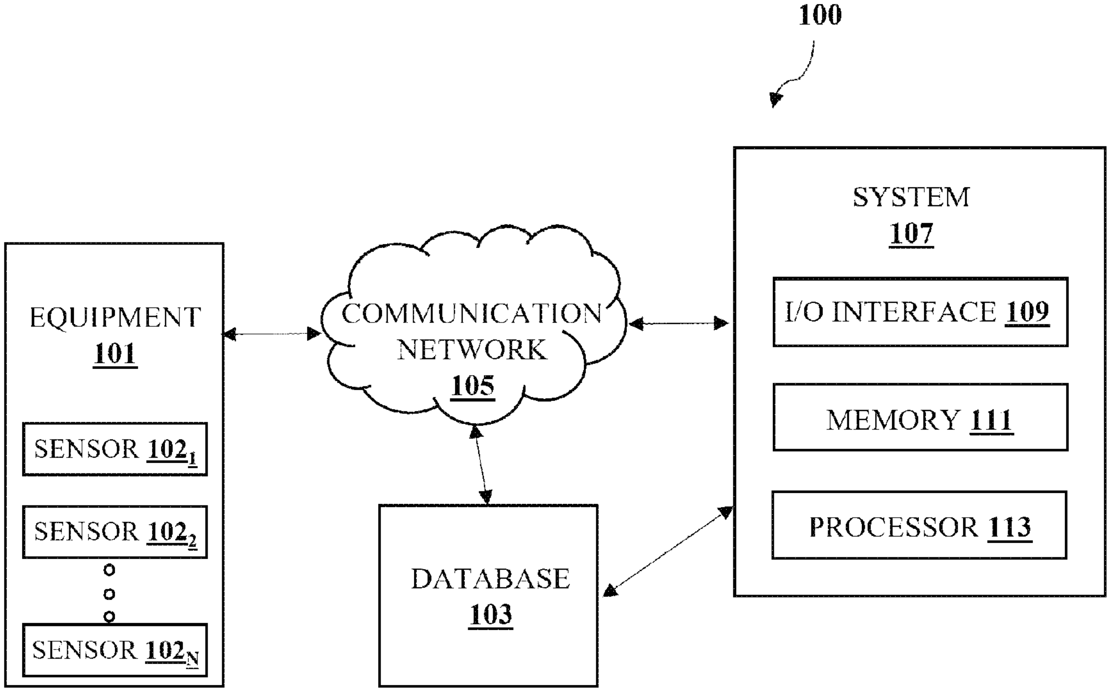

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of embodiments of the disclosure, reference is made to the accompanying drawings which illustrates specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments disclose a method and a system for accurately identifying fault resolution steps for an equipment. The equipment can be any machine, machine parts, device or device parts. The method includes capturing multi-modal diagnosis data comprising at least one of visual data, audio data, and sensor data associated with at least one primary part in the equipment. By using the multi-modal diagnosis data, deep learning models are trained to predict fault state and to detect fault location in the equipment. The trained deep learning models are linked with a resolution procedure such as identifying fault resolution steps and providing hidden issue checklist for fixing the fault/issue. The fault resolution steps and/or the hidden issue checklist is rendered on at least one of a display interface and an Augmented Reality (AR) device for a user to detect the equipment, identify the fault state and fault location on the equipment and resolve the fault. The present disclosure uses multi-modal diagnosis data (as input) such as sensor data, audio data, and visual data, thereby, achieving increased accuracy in determination of fault in real-time. Further, the use of deep learning models in combination with the multi-modal diagnosis data (as input) in the present disclosure reduces computational complexity, leading to reduction in latency and improving real-time speed of identifying fault resolution steps for the equipment.

FIG. 1 illustrates an environment for identifying fault resolution steps for an equipment in accordance with some embodiments of the present disclosure.

In the FIG. 1, the environment 100 includes an equipment 101, a database 103, a communication network 105 and a system 107. The equipment 101 can be any machine, machine parts, device or device parts. The equipment 101 comprises at least one primary part (also, referred as a main part). In one embodiment, the equipment 101 comprises secondary parts (also, referred as auxiliary parts) in addition to the at least one primary part where the secondary parts are communicably connected to the at least one primary part. The equipment 101 may include one or more sensors $\mathbf{102}_1$, $\mathbf{102}_2$, up to $\mathbf{102}_N$ (collectively referred as 102 hereafter). The sensors 102 are located at different locations on the equipment 101. The one or more sensors 102 send information (also, referred as sensor data) related to condition or performance of the equipment 101 to the system 107 using the communication network 105. The system 107 captures multi-modal diagnosis data associated with the at least one primary part in the equipment. The multi-modal diagnosis data comprises at least one of visual data, audio data, and sensor data. The visual data comprises one or more images and/or video of the equipment 101. The visual data may be captured using one or more cameras attached in a close proximity to the equipment 101. In case of video, the video is segmented into individual images or frames per second. The audio data comprises sound or vibration of the equipment 101. The audio data may be captured using audio recording device attached in a close proximity to the equipment 101. The sensor data is received from the one or more sensors 102. The communication network 105 can be any of the following, but is not limited to, communication protocols/methods: a direct interconnection, an e-commerce network, a Peer-to-Peer (P2P) network, Local Area Network (LAN), Wide Area Network (WAN), wireless network (for example, using Wireless Application Protocol), Internet, Wi-Fi, Bluetooth and the like. In one embodiment, the one or more sensors 102 are a part of the system 107, especially, a data capturing module (discussed later in detail) instead of the equipment 101.

In the embodiment, the system 107 may include an Input/Output (I/O) interface 109, a memory 111, and a processor 113. The I/O interface 109 is configured to receive/capture multi-modal diagnosis data associated with the at least one primary part in the equipment 101. The I/O interface 109 employs communication protocols/methods such as, without limitation, audio, analog, digital, monaural, Radio Corporation of America (RCA) connector, stereo, IEEE®-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI®), Radio Frequency (RF) antennas, S-Video, Video Graphics Array (VGA), IEEE® 802.11b/g/n/x, Bluetooth, cellular e.g., Code-Division Multiple Access (CDMA), High-Speed Packet Access (HSPA+), Global System for Mobile communications (GSM®), Long-Term Evolution (LTE®), Worldwide interoperability for Microwave access (WiMax®), or the like.

The multi-modal diagnosis data received/captured by the I/O interface 109 is stored in the memory 111. The memory 111 is communicatively coupled to the processor 113 of the system 107. The memory 111, also, stores processor-executable instructions which may cause the processor 115 to execute the instructions for identifying fault resolution steps for the equipment 101. The memory 111 includes, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 113 includes at least one data processor for identifying fault resolution steps for the equipment 101. The processor 113 may include specialized processing units such as integrated system (bus) controllers, memory management control units, floating point units, graphics processing units, digital signal processing units, etc.

The database 103 stores data associated with the at least one primary part, data associated with the secondary parts, and data associated with related parts of the at least one primary part. The data stored in the database 103 may be referred as historic data. The database 103 is updated at pre-defined intervals of time. These updates relate to the data associated with the at least one primary part, the data associated with the secondary parts, and the data associated with the related parts of the at least one primary part.

Hereinafter, the operation of the system 107 is explained briefly. Under a normal condition, the equipment 101 operates without any fault/problem. The system 107 continuously monitors the equipment 101 by capturing the multi-modal diagnosis data associated with the at least one primary part in the equipment 101. The multi-modal diagnosis data comprises at least one of visual data, audio data, and sensor data. When the equipment 101 encounters a fault, the system 107 obtains multi-modal features of the at least one primary part from the multi-modal diagnosis data. In detail, the system 107 extracts a plurality of object feature data from the multi-modal diagnosis data. The multi-modal diagnosis data may include details that may not be necessary for detection of fault in the equipment 101 such as background noise, and the like. The system 107 removes/filters these unnecessary details to extract the plurality of object feature data, which includes filtered/necessary visual data, audio data, and/or sensor data. Thereafter, the system 107 combines the plurality of object feature data to obtain the multi-modal features of the at least one primary part. The system 107 detects a condition state of the at least one primary part using the multi-modal features and a trained object fault detection model (described later). The condition state is one of a faulty state and a healthy state. When the condition state of the at least one primary part is detected as the healthy state, the system 107 continues monitoring the equipment 101 to capture the multi-modal diagnosis data associated with the at least one primary part in the equipment 101. When the condition state of the at least one primary part is detected as the faulty state, the system 107 determines location of a fault on the at least one primary part using a trained fault location prediction model (described later). Subsequently, the system 107 identifies primary fault resolution steps for the at least one primary part based on the historic data (stored in the database 103) associated with the at least one primary part and the location of the fault.

In one embodiment, the system 107 identifies secondary resolution steps for secondary parts based on the primary fault resolution steps. The secondary parts are communicably connected to the at least one primary part of the equipment 101. Thereafter, the system 107 renders at least one of the primary fault resolution steps and the secondary resolution steps on at least one of a display interface and an Augmented Reality (AR) device for resolution of the fault. The display interface may comprise a Liquid Crystal Display (LCD), a display screen and the like. The AR device may comprise a Head Mounted Display (HMD).

In another embodiment, the system 107 provides a hidden issue checklist to identify a problem in at least one of secondary parts and related parts of the at least one primary part when the problem/fault associated with at least one of the secondary parts and the related parts of the at least one primary part is not detectable/not visible. To provide the hidden issue checklist, the system 107 utilizes at least one of the historic data (stored in the database 103) associated with the secondary parts, the historic data associated with the related parts of the at least one primary part and the primary fault resolution steps to identify the problem in at least one of secondary parts and related parts of the at least one primary part of the equipment 101. Thereafter, the system 107 renders at least one of the primary fault resolution steps and the hidden issue checklist on at least one of the display interface and the AR device for resolution of the fault.

Figure 2A:
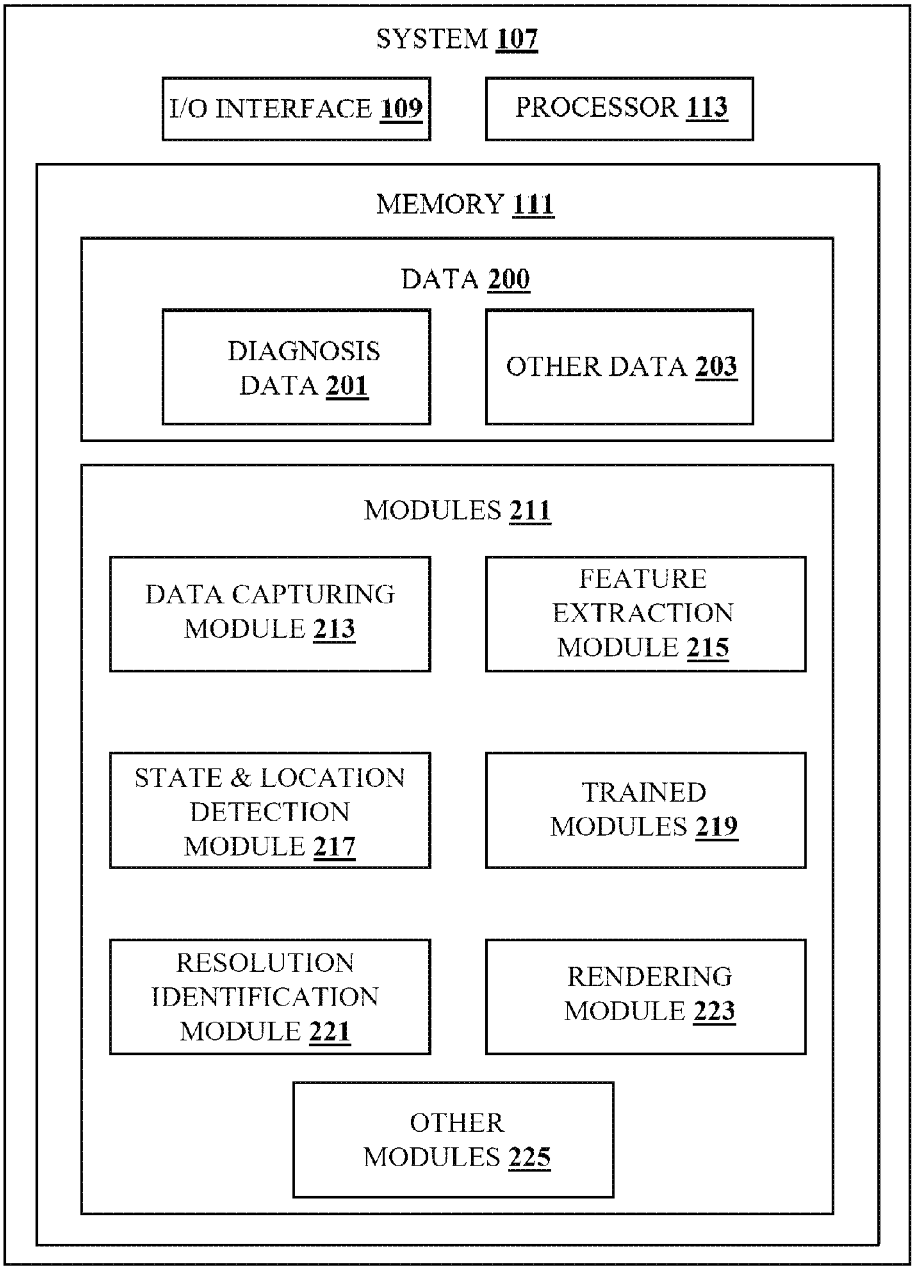

FIG. 2*a* shows a detailed block diagram of a system in accordance with some embodiments of the present disclosure.

The system 107, in addition to the I/O interface 109 and processor 113 described above, includes data 200 and one or more modules 211, which are described herein in detail. In the embodiment, the data 200 may be stored within the memory 111. The data 200 include, for example, diagnosis data 201 and other data 203.

The diagnosis data 201 includes multi-modal diagnosis data comprising at least one of visual data, audio data, and sensor data. The visual data comprises one or more images and/or video of the equipment 101. In case of video, the video is segmented into individual images or frames per second. Additionally, within an image, data such as texture features, color features, corner key points, or the like are considered for visual data. The data within the image (also, referred as image features) such as texture features, colour features, and corner key points of the image help the trained model (i.e., a trained object fault detection model) to identify the faulty nature of the part or object of the equipment 101. These features also help the trained model (i.e., a trained fault location prediction model) to identify the location of the fault in the part. The trained models extract these features from the part or object of the equipment 101. The audio data comprises sound or vibration of the equipment 101 such as pitch, beat related descriptors, note onsets, fluctuation patterns, amplitude envelope, energy, spectral centroid, spectral flux, zero-crossing rate, or the like. The sensor data comprises information related to condition or performance of the equipment 101.

The other data 203 stores data, including temporary data and temporary files, generated by one or more modules 211 for performing the various functions of the system 107.

In the embodiment, the data 200 in the memory 111 are processed by the one or more modules 211 present within the memory 111 of the system 107. In the embodiment, the one or more modules 211 are implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 211 are communicatively coupled to the processor 113 for performing one or more functions of the system 107. The said modules 211 when configured with the functionality defined in the present disclosure results in a novel hardware.

In one implementation, the one or more modules 211 include, but are not limited to, a data capturing module 213, a feature extraction module 215, a state and location detection module 217, trained modules 219, a resolution identification module 221, and a rendering module 223. The one or more modules 211, also, includes other modules 225 to perform various miscellaneous functionalities of the system 107.

The data capturing module 213 captures/receives multi-modal diagnosis data associated with at least one primary part in the equipment 101 in real-time. The multi-modal diagnosis data comprises at least one of visual data, audio data, and sensor data. The visual data comprises one or more images and/or video of the equipment 101. In case of video, the video is segmented into individual images or frames per second. The audio data comprises sound or vibration of the equipment 101. The sensor data includes information related to condition or performance of the equipment 101. The multi-modal diagnosis data is received/captured by the data capturing module 213 via the I/O interface 109 of the system 107 and the communication network 105. The sensor data is received from the one or more sensors 102. The multi-modal diagnosis data captured/received by the data capturing module 213 is used for training an object fault detection model for fault detection and a fault location prediction model for determining location of the fault.

During training phase, multi-modal diagnosis data are captured for the at least one primary part of the equipment 101, related parts of the at least one primary part of the equipment 101 and secondary parts in a healthy state and in a faulty state. In case of visual data such as video, the video is segregated into individual frames/images for further processing. During the training phase, an offline video stream is segregated into individual sequential frames/images. The images are sequenced as $I=(I_1, I_2, I_3, \ldots, I_n)$, where $I_i$'s is ordered sequence of images for each i=1, 2, . . . n. Further, the audio data comprises sound or vibration of the equipment 101. In detail, the audio data includes pitch, beat-related descriptors, note onsets, fluctuation patterns, amplitude envelope, energy, spectral centroid, spectral flux, zero-crossing rate and the like. The audio data are sequenced as $A=(A_1, A_2, A_3, \ldots, A_n)$, where $A_i$'s is ordered sequence of audio features for each i=1, 2, . . . n. Further, the sensor data includes information related to condition or performance of the equipment 101. The captured multi-modal diagnosis data are used for detecting a condition state such as the normal/healthy state or the faulty state of the at least one primary part.

An object fault detection model and a fault location prediction model are generated by training deep learning models using the captured/received multi-modal diagnosis data. The generated models are used for predicting the condition state of the at least one primary part and location of a fault (also, referred as Region of Interest (ROI)) of the at least one primary part. In one embodiment, machine learning classifier model such as logistic regression, random forest model and the like is used for training the faulty state or healthy state of the at least one primary part of the equipment 101, related parts of the at least one primary part of the equipment 101 and secondary parts. In case of the at least one primary part of the equipment 101 is in the faulty state, the trained fault location prediction model predicts the location of a fault on the at least one primary part. The location of the fault on the at least one primary part is used to identify primary fault resolution steps for the at least one primary part. In one embodiment, based on the primary fault resolution steps, secondary resolution steps are identified for the secondary parts. In another embodiment, when the problem associated with at least one of the secondary parts and the related parts of the at least one primary part is not detectable/not visible, a hidden issue checklist is provided to identify a problem in at least one of secondary parts and related parts of the at least one primary part, based on at least one of the historic data associated with the secondary parts, the historic data associated with the related parts of the at least one primary part and the primary fault resolution steps.

During testing phase, the real time multi-modal diagnosis data is captured via an AR device. In case of visual data in the form of video, the video is segregated into individual sequential frames/images. Here, the images are sequenced as $I=(IR_1, IR_2, IR_3, \ldots, IR_n)$, where $IR_n$'s is ordered sequence of images for each i=1, 2, . . . n. Further, the extracted features of the sequential images are used to test the trained model (i.e., trained object fault detection model) in real time to predict the condition state (i.e., in normal/healthy state or faulty state) of the at least one primary part. Further, the trained model (i.e., trained fault location prediction model) is also used to predict the location of the fault, in case the condition state is faulty state. Similarly, other inputs of the multi-modal diagnosis data such as audio data and sensor data are also used to predict the condition state such as faulty state or healthy state. In real time, these multi-modal diagnosis data are fused/combined to arrive at the final state of the equipment 101.

The feature extraction module 215 obtains multi-modal features of the at least one primary part from the multi-modal diagnosis data. In detail, the feature extraction module 215 receives the captured multi-modal diagnosis data corresponding to the at least one primary part. After receiving the multi-modal diagnosis data, the feature extraction module 215 extracts a plurality of object feature data from the multi-modal diagnosis data. The multi-modal diagnosis data may include details that may not be necessary for detection of fault in the equipment 101 such as background noise and the like. The system 107 removes/filters these unnecessary details to extract the plurality of object feature data, which includes filtered/necessary visual data, audio data, and/or sensor data. Thereafter, the feature extraction module 215 combines/fuses the plurality of object feature data (i.e., filtered/necessary visual data, audio data, and/or sensor data) to obtain the multi-modal features of the at least one primary part. During training phase, the fused data (i.e., the multi-modal features) is utilized to train models i.e., the object fault detection model for detecting fault and the fault location prediction model for locating fault. During testing phase, the trained models i.e., the trained object fault detection model and the trained fault location prediction model are tested with the fused/combined data (i.e., the multi-modal features) on the AR device for detecting and locating fault.

Figure 2B:
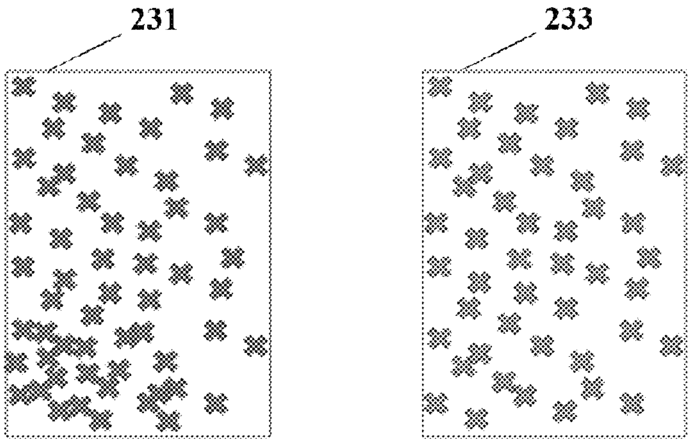
Figure 2C:
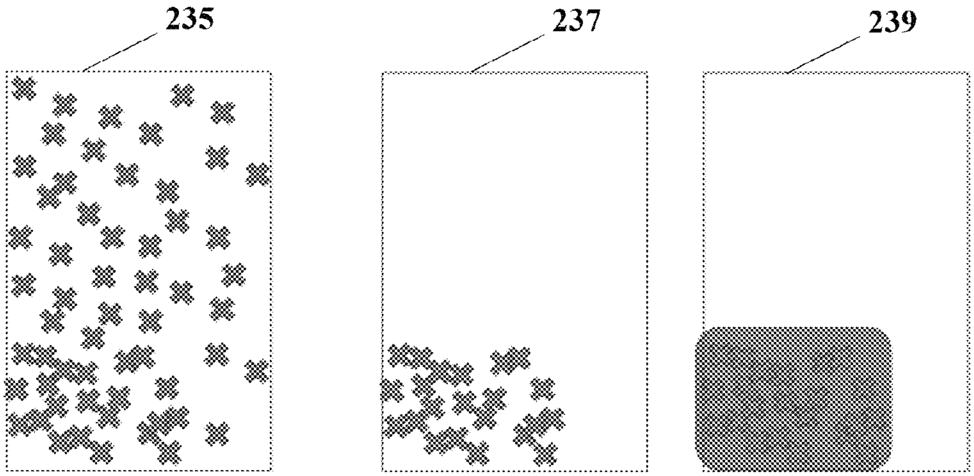

The state and location detection module 217 (also, referred as a condition state and location detection module) receive the fused/combined data (i.e., the multi-modal features) of the at least one primary part from the feature extraction module 215. The state and location detection module 217 detects a condition state of the at least one primary part using the multi-modal features and the trained object fault detection model. The state and location detection module 217 detects the condition state whether it is faulty state or healthy state. When the condition state of the at least one primary part is detected as a faulty state, the state and location detection module 217 determines location of a fault on the at least one primary part using the trained fault location prediction model. In detail, the state and location detection module 217 using the multi-modal features and the trained object fault detection model compares predicted multi-modal features 231 of the at least one primary part with actual multi-modal features 233 of the at least one primary part as shown in FIG. 2*b*. On comparison, the state and location detection module 217 eliminates the features that are having similarity with the original features 235 and identifies the unmatched features 237. Further, the state and location detection module 217 identifies a bounding region with highly concentrated unmatched features (based on a pre-defined threshold) region 239 as the fault location on the at least one primary part as shown in the FIG. 2*c*. After identifying the region of fault location, the state and location detection module 217 identifies secondary parts and/or related parts of the at least one primary part that are within the region of fault location.

The trained modules 219 are also referred as trained models. The trained modules 219 include the object fault detection model and the fault location prediction model. The object fault detection model is used to detect the condition state of the at least one primary part using the multi-modal features. The object fault detection model is generated by training a deep learning model using the fused/combined multi-modal features comprising faulty data and healthy data. The trained object fault detection model is used to predict/detect the condition state in real time, thus, indicating the at least one primary part in the equipment 101 to be in a faulty state or in a healthy state. In case of faulty state, the fault location prediction model is used to determine the location of a fault (i.e., ROI) on the at least one primary part. The fault location prediction model is generated by training a deep learning model with the faulty data and healthy data such as images of the at least one primary part. The trained fault location prediction model is used to predict the fault location on the at least one primary part. The models i.e., object fault detection model and fault location prediction model are based on machine learning classifier model such as logistic regression, random forest model and the like.

The resolution identification module 221 identifies primary fault resolution steps for the at least one primary part based on historic data associated with the at least one primary part and the location of the fault. The location of fault is received from the state and location detection module 217. The historic data associated with the at least one primary part is stored in the database 103. The fault resolution steps are step-by-step maintenance or repair procedures. These steps are derived from a similar primary part repair or maintenance from past for the equipment 101. In one embodiment, the resolution identification module 221 identifies secondary resolution steps for secondary parts based on the primary fault resolution steps. In detail, the resolution identification module 221 identifies dependent procedural steps (i.e., secondary resolution steps) associated with other parts (i.e., secondary parts) of the equipment 101 dynamically that are impacting or are impacted by the primary fault resolution steps. In another embodiment, the resolution identification module 221 provides a hidden issue checklist to identify a problem in at least one of secondary parts and related parts of the at least one primary part, based on at least one of the historic data associated with the secondary parts, the historic data associated with the related parts of the at least one primary part and the primary fault resolution steps. This is when the problem associated with at least one of the secondary parts and the related parts of the at least one primary part is not detectable/visible. This approach allows a user to perform steps in the hidden issue checklist to validate at least one of the secondary parts and the related parts of the at least one primary part in order to narrow down to the exact problem. Once the problem is identified, the resolution identification module 221 provides fault resolution steps for troubleshooting/problem resolution.

In one embodiment, the rendering module 223 renders at least one of the primary fault resolution steps and the secondary resolution steps on at least one of a display interface and an AR device for resolution of the fault. In another embodiment, the rendering module 223 renders at least one of the primary fault resolution steps and the hidden issue checklist on at least one of a display interface and an AR device for resolution of the fault. The display interface may comprise a Liquid Crystal Display (LCD), a display screen and the like. The AR device may comprise a Head Mounted Display (HMD). For instance, these fault resolution steps i.e., the primary fault resolution steps, the secondary resolution steps and the hidden issue checklist are rendered on the HMD device of a user to perform repair or maintenance steps on the equipment 101 in real-time. For the hidden issue checklist, a user performs steps in the hidden issue checklist to validate at least one of the secondary parts and the related parts of the at least one primary part in order to narrow down to the exact problem. Once the problem is identified and the resolution identification module 221 provides fault resolution steps for troubleshooting/problem resolution, the rendering module 223 renders the fault resolution steps to the user through at least one of the display interface and the AR device.

Figure 3:
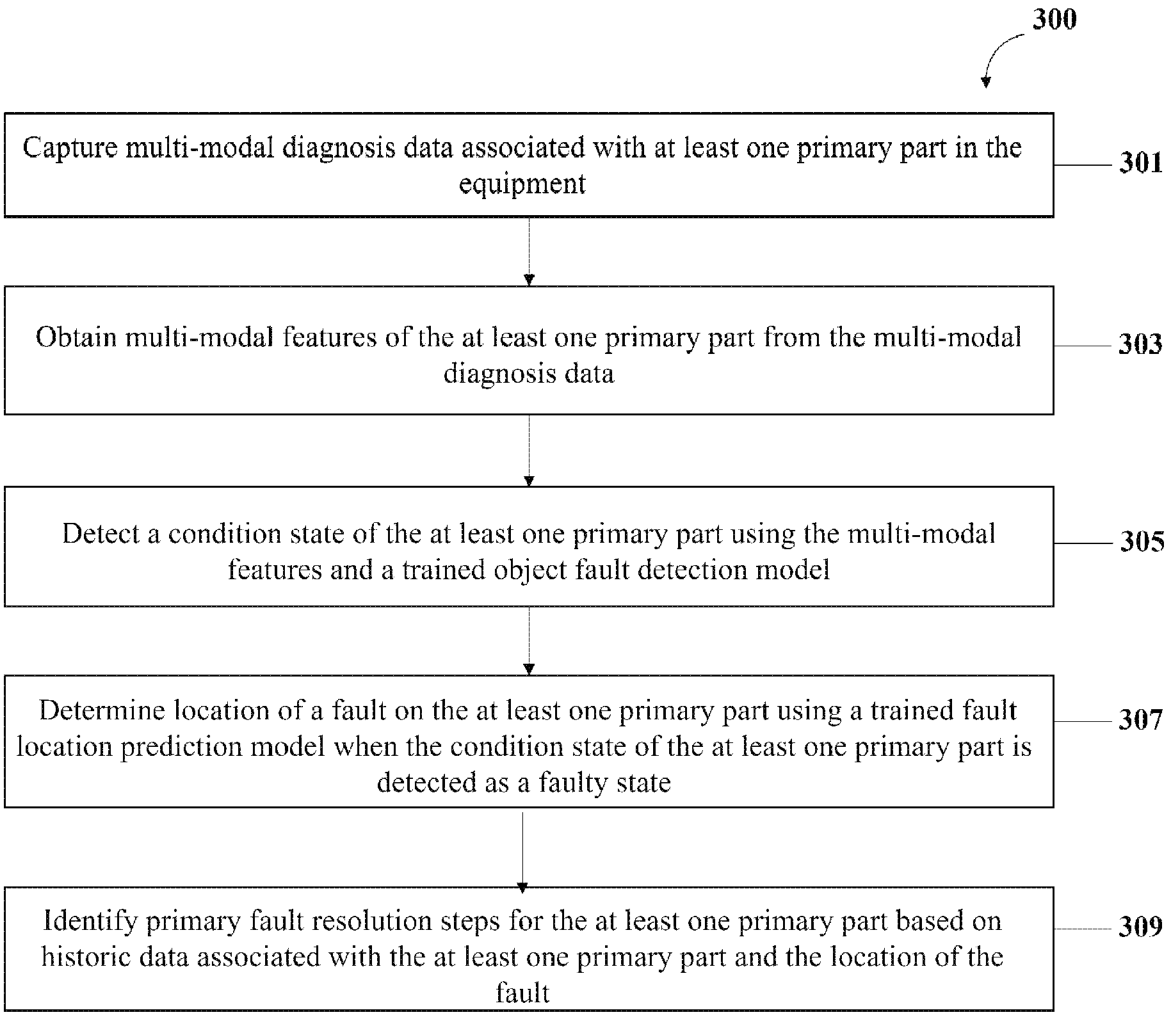
FIG. 3 illustrates a flowchart showing a method of identifying fault resolution steps for an equipment in accordance with some embodiments of present disclosure.

FIG. 3 illustrates a flowchart showing a method of identifying fault resolution steps for an equipment in accordance with some embodiments of present disclosure.

As illustrated in FIG. 3, the method 300 includes one or more blocks for identifying fault resolution steps for the equipment 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the date capturing module 213 of the system 107 may capture multi-modal diagnosis data associated with at least one primary part in the equipment 101. The multi-modal diagnosis data may comprise at least one of visual data, audio data, and sensor data.

At block 303, the feature extraction module 215 of the system 107 may obtain multi-modal features of the at least one primary part from the multi-modal diagnosis data. In detail, the feature extraction module 215 of the system 107 may extract a plurality of object feature data from the multi-modal diagnosis data and thereafter, may combine the plurality of object feature data to obtain the multi-modal features of the at least one primary part.

At block 305, the state and location detection module 217 of the system 107 may detect a condition state of the at least one primary part using the multi-modal features and a trained object fault detection model. The condition state may be one of the faulty state and a healthy state.

At block 307, the state and location detection module 217 of the system 107 may determine location of a fault on the at least one primary part using a trained fault location prediction model when the condition state of the at least one primary part is detected as a faulty state.

At block 309, the resolution identification module 221 of the system 107 may identify primary fault resolution steps for the at least one primary part based on historic data associated with the at least one primary part and the location of the fault.

Further, the resolution identification module 221 of the system 107 may identify secondary resolution steps for secondary parts based on the primary fault resolution steps. Furthermore, the resolution identification module 221 of the system 107 may provide a hidden issue checklist to identify a problem in at least one of secondary parts and related parts of the at least one primary part, based on at least one of the historic data associated with the secondary parts, the historic data associated with the related parts of the at least one primary part and the primary fault resolution steps, when the problem associated with at least one of the secondary parts and the related parts of the at least one primary part is not detectable/visible. The secondary parts may be communicably connected to the at least one primary part.

Some of the advantages of the present disclosure are listed below.

The present disclosure uses multi-modal diagnosis data (as input) such as machine performance (sensor data), sound/vibration (audio data), and visual inspection (visual data), thereby, achieving increased accuracy in determination of fault in real-time.

The present disclosure helps in accurately identifying secondary resolution steps for secondary parts based on the primary fault resolution steps. Further, the present disclosure helps in providing a hidden issue checklist to identify a problem in at least one of secondary parts and related parts of the at least one primary part when the problem associated with at least one of the secondary parts and the related parts of the at least one primary part is not detectable/visible.

The use of deep learning models (i.e., the object fault detection model and the fault location prediction model) in combination with the multi-modal diagnosis data (as input) in the present disclosure reduces computational complexity, leading to reduction in latency and improving real-time speed of identifying fault resolution steps for an equipment.

The use of multi-modal diagnosis data, which is a fused/combined data including sensor data, audio data and visual data, provides a comprehensive data set for training the deep learning models, thereby, making the method disclosed in the present disclosure highly reliable.

Figure 4:
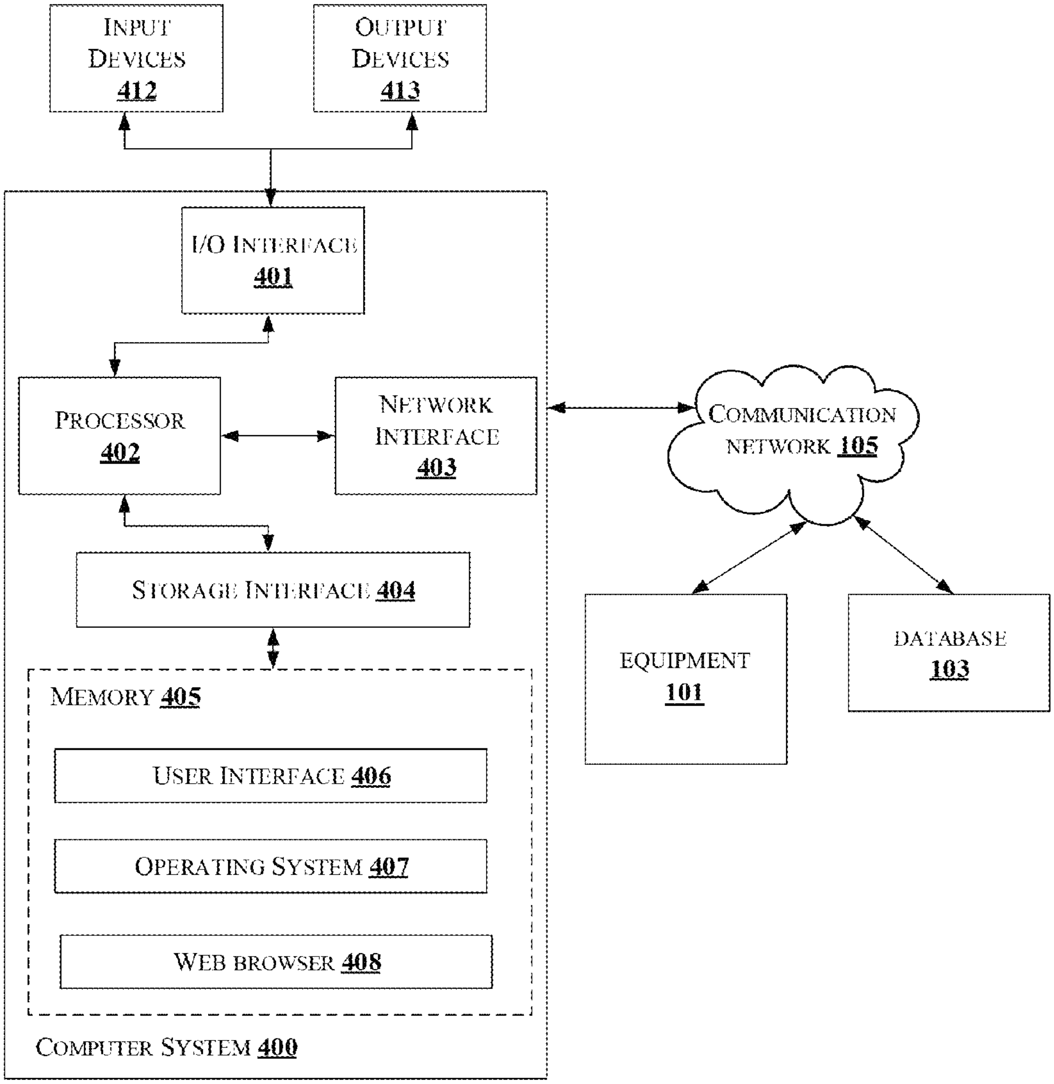
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be used to implement the system 107. The computer system 400 may include a central processing unit ("CPU" or "processor") 402. The processor 402 may include at least one data processor for identifying fault resolution steps for an equipment. The processor 402 may include specialized processing units such as, integrated system (bus) controllers, memory management control units, floating point units, graphics processing units, digital signal processing units, etc.

The processor 402 may be disposed in communication with one or more input/output (I/O) devices (not shown in FIG. 4) via I/O interface 401. The I/O interface 401 employ communication protocols/methods such as, without limitation, audio, analog, digital, monaural, Radio Corporation of America (RCA) connector, stereo, IEEE®-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI®), Radio Frequency (RF) antennas, S-Video, Video Graphics Array (VGA), IEEE® 802.11b/g/n/x, Bluetooth, cellular e.g., Code-Division Multiple Access (CDMA), High-Speed Packet Access (HSPA+), Global System for Mobile communications (GSM®), Long-Term Evolution (LTE®), Worldwide interoperability for Microwave access (WiMax®), or the like.

Using the I/O interface 401, the computer system 400 may communicate with one or more I/O devices such as input devices 412 and output devices 413. For example, the input devices 412 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 413 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 400 consists of the system 107. The processor 402 may be disposed in communication with the communication network 105 via a network interface 403. The network interface 403 may communicate with the communication network 105. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. The communication network 105 may include, without limitation, a direct interconnection, Local Area Network (LAN), Wide Area Network (WAN), wireless network (e.g., using Wireless Application Protocol), the Internet, etc. Using the network interface 403 and the communication network 105, the computer system 400 may communicate with the equipment 101 and the database 103. The network interface 403 may employ connection protocols include, but not limited to, direct connect, Ethernet (e.g., twisted pair 10/100/1000 Base T), Transmission Control Protocol/Internet Protocol (TCP/IP), token ring, IEEE® 802.11a/b/g/n/x, etc.

The communication network 105 includes, but is not limited to, a direct interconnection, a Peer to Peer (P2P) network, Local Area Network (LAN), Wide Area Network (WAN), wireless network (e.g., using Wireless Application Protocol), the Internet, Wi-Fi and such.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, Serial Advanced Technology Attachment (SATA), Integrated Drive Electronics (IDE), IEEE®-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, etc. In some embodiments, computer system 400 may store user/application data, such as, the data, variables, records, etc., as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. The computer system 400 may implement a mail server (not shown in FIG. 4) stored program component. The mail server may be an Internet mail server such as Microsoft Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. The computer system 400 may implement a mail client (not shown in FIG. 4) stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

REFERRAL NUMERALS

| Reference number | Description |
|---|---|
| 100 | Environment |
| 101 | Equipment |
| $102_1$, $102_2$ . . . $102_N$ | One or more Sensors |
| 103 | Database |
| 105 | Communication network |
| 107 | System |
| 109 | I/O interface |
| 111 | Memory |
| 113 | Processor |
| 200 | Data |
| 201 | Diagnosis data |
| 203 | Other data |
| 211 | Modules |
| 213 | Data capturing module |
| 215 | Feature extraction module |
| 217 | State and location detection module |
| 219 | Trained modules |
| 221 | Resolution identification module |
| 223 | Rendering module |
| 225 | Other modules |
| 400 | Computer system |
| 401 | I/O interface |
| 402 | Processor |
| 403 | Network interface |
| 404 | Storage interface |
| 405 | Memory |
| 406 | User interface |
| 407 | Operating system |
| 408 | Web browser |
| 412 | Input devices |
| 413 | Output devices |

What is claimed is:

1. A computer-implemented method of identifying fault resolution steps for an equipment, the method comprising:

capturing, by a processor of a system, multi-modal diagnosis data associated with at least one primary part in the equipment, wherein the multi-modal diagnosis data comprises at least one of visual data captured using one or more cameras, audio data captured using audio recording device attached in proximity to the equipment, and sensor data captured using one or more sensors located on the equipment;

obtaining, by the processor of the system, multi-modal features of the at least one primary part from the multi-modal diagnosis data;

detecting, by the processor of the system, a condition state of the at least one primary part using the multi-modal features and a trained object fault detection model;

determining, by the processor of the system, location of a fault on the at least one primary part using a trained fault location prediction model when the condition state of the at least one primary part is detected as a faulty state, wherein the trained fault location prediction model utilizes at least one of texture features, colour features, and corner key points within the visual data and pitch, beat related descriptors, note onsets, fluctuation patterns, amplitude envelope, energy, spectral centroid, spectral flux, zero-crossing rate within the audio data to determine the location of the fault, and wherein the trained fault location prediction model fuses the texture features, the colour features, the corner key points, and the audio data to determine the location of the fault comprising a region of interest or bounding region on the at least one primary part;

identifying, by the processor of the system, primary fault resolution steps for the at least one primary part based on historic data associated with the at least one primary part and the location of the fault;

providing, by the processor of the system, a hidden issue checklist to identify a problem in at least one of secondary parts and related parts of the at least one primary part, based on at least one of the historic data associated with the secondary parts, the historic data associated with the related parts of the at least one primary part and the primary fault resolution steps, when the problem associated with at least one of the secondary parts and the related parts of the at least one primary part is not detectable; and rendering, by the processor of the system, at least one of the primary fault resolution steps and the hidden issue checklist on at least one of a display interface and an Augmented Reality (AR) device for resolution of the fault, wherein the secondary parts are communicably connected to the at least one primary part.

2. The method as claimed in claim 1, further comprising: identifying secondary resolution steps for secondary parts based on the primary fault resolution steps; and rendering the secondary resolution steps on at least one of the display interface and the Augmented Reality (AR) device for resolution of the fault.

3. The method as claimed in claim 1, wherein the obtaining multi-modal features of the at least one primary part from the multi-modal diagnosis data comprises:

extracting a plurality of object feature data from the multi-modal diagnosis data; and combining the plurality of object feature data to obtain the multi-modal features of the at least one primary part.

4. The method as claimed in claim 1, wherein the condition state is one of the faulty state and a healthy state.

5. A system for identifying fault resolution steps for an equipment, the system comprising:

a processor; and a memory communicatively coupled to the processor, wherein the memory stores processor-executable instructions, which on execution, cause the processor to:

capture multi-modal diagnosis data associated with at least one primary part in the equipment, wherein the multi-modal diagnosis data comprises at least one of visual data captured using one or more cameras, audio data captured using audio recording device attached in proximity to the equipment, and sensor data captured using one or more sensors located on the equipment;

obtain multi-modal features of the at least one primary part from the multi-modal diagnosis data;

detect a condition state of the at least one primary part using the multi-modal features and a trained object fault detection model;

determine location of a fault on the at least one primary part using a trained fault location prediction model when the condition state of the at least one primary part is detected as a faulty state, wherein the trained fault location prediction model utilizes at least one of texture features, colour features, and corner key points within the visual data and pitch, beat related descriptors, note onsets, fluctuation patterns, amplitude envelope, energy, spectral centroid, spectral flux, zero-crossing rate within the audio data to determine the location of the fault, and wherein the trained fault location prediction model fuses the texture features, the colour features, the corner key points, and the audio data to determine the location of the fault comprising a region of interest or bounding region on the at least one primary part;

identify primary fault resolution steps for the at least one primary part based on historic data associated with the at least one primary part and the location of the fault provide a hidden issue checklist to identify a problem in at least one of secondary parts and related parts of the at least one primary part, based on at least one of the historic data associated with the secondary parts, the historic data associated with the related parts of the at least one primary part and the primary fault resolution steps, when the problem associated with at least one of the secondary parts and the related parts of the at least one primary part is not detectable; and render at least one of the primary fault resolution steps and the hidden issue checklist on at least one of a display interface and an Augmented Reality (AR) device for resolution of the fault, wherein the secondary parts are communicably connected to the at least one primary part.

6. The system as claimed in claim 5, wherein the processor is configured to:

identify secondary resolution steps for secondary parts based on the primary fault resolution steps; and render the secondary resolution steps on at least one of the display interface and the Augmented Reality (AR) device for resolution of the fault.

7. The system as claimed in claim 5, wherein the processor is configured to:

extract a plurality of object feature data from the multi-modal diagnosis data; and combine the plurality of object feature data to obtain the multi-modal features of the at least one primary part.

8. The system as claimed in claim 5, wherein the condition state is one of the faulty state and a healthy state.

9. A non-transitory computer readable medium including instructions stored thereon that when processed by at least one processor cause a system to perform operations comprising:

capturing multi-modal diagnosis data associated with at least one primary part in the equipment, wherein the multi-modal diagnosis data comprises at least one of visual data captured using one or more cameras, audio data captured using audio recording device attached in proximity to the equipment, and sensor data captured using one or more sensors located on the equipment;

obtaining multi-modal features of the at least one primary part from the multi-modal diagnosis data;

detecting a condition state of the at least one primary part using the multi-modal features and a trained object fault detection model;

determining location of a fault on the at least one primary part using a trained fault location prediction model when the condition state of the at least one primary part is detected as a faulty state, wherein the trained fault location prediction model utilizes at least one of texture features, colour features, and corner key points within the visual data and pitch, beat related descriptors, note onsets, fluctuation patterns, amplitude envelope, energy, spectral centroid, spectral flux, zero-crossing rate within the audio data to determine the location of the fault, and wherein the trained fault location prediction model fuses the texture features, the colour features, the corner key points, and the audio data to determine the location of the fault comprising a region of interest or bounding region on the at least one primary part;

identifying primary fault resolution steps for the at least one primary part based on historic data associated with the at least one primary part and the location of the fault;

providing a hidden issue checklist to identify a problem in at least one of secondary parts and related parts of the at least one primary part, based on at least one of the historic data associated with the secondary parts, the historic data associated with the related parts of the at least one primary part and the primary fault resolution steps, when the problem associated with at least one of the secondary parts and the related parts of the at least one primary part is not detectable; and rendering at least one of the primary fault resolution steps and the hidden issue checklist on at least one of a display interface and an Augmented Reality (AR) device for resolution of the fault, wherein the secondary parts are communicably connected to the at least one primary part.

10. The medium as claimed in claim 9, wherein the instructions cause the at least one processor to:

identify secondary resolution steps for secondary parts based on the primary fault resolution steps; and render the secondary resolution steps on at least one of the display interface and the Augmented Reality (AR) device for resolution of the fault.

11. The medium as claimed in claim 9, wherein the instructions cause the at least one processor to:

extract a plurality of object feature data from the multi-modal diagnosis data; and combine the plurality of object feature data to obtain the multi-modal features of the at least one primary part.

12. The medium as claimed in claim 9, wherein the condition state is one of the faulty state and a healthy state.

* * * * *